3,264,289
Δ²⁰-11:18;18:20-BISOXIDO-PREGNENES AND
PROCESS THEREFOR
Julius Schmidlin, Basel, Switzerland, assignor to Ciba Corporation, New York, N.Y., a corporation of Delaware
No Drawing. Filed Sept. 25, 1964, Ser. No. 399,400
Claims priority, application Switzerland, Oct. 3, 1963, 12,173/63
20 Claims. (Cl. 260—239.55)

The present invention provides new 21-unsubstituted Δ²⁰-11β:18;18:20-bisoxidopregnene compounds, more especially those of the partial formula

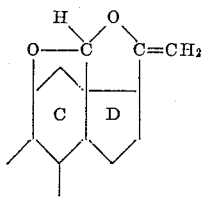

as well as a process for their manufacture. The new compounds are valuable intermediates for the manufacture of pharmacologically active 11:18-dioxygenated corticoids, for example of aldosterone and its analogues.

According to the present process a 21-unsubstituted 11β:18-oxido-18-hydroxy-20-oxopregnane compound or a reactive, functional 20-oxo derivative, more especially a 20-ketal thereof, is reacted with a Lewis acid in an inert, anhydrous medium. If desired, the resulting Δ²⁰-11β:18;18:20-bisoxidopregnene compound may be hydroxylated or epoxidized in the 20:21-position, an epoxide obtained may be hydrolysed or acylolysed and/or a resulting 21-hydroxy compound may be esterified; in this manner an 11β:18-oxido-18:21-dihydroxy-20-oxopregnane or a 21-ester thereof is obtained.

As starting materials for use in the present process there are suitable 21-unsubstituted 11β:18-oxido-18-hydroxy-20-oxo-5α- or 5-β-pregnanes and their 19-nor derivatives; they may contain one or more additional substituents in the ring system, for example free, esterified or etherified hydroxyl groups, free or ketalized or enolized oxo groups, lower alkyl or alkylene groups such as methyl, ethyl or methylene groups, or halogen such as fluorine or chlorine atoms. Furthermore, they may contain one or more double bonds, more especially in positions 1(2) and/or 4(5) or 5(6). Reactive, functional 20-oxo derivatives are primarily ketals of lower aliphatic alcohols, preferably of lower alkanols or alkandiols, such as methanol, ethanol, propanol, isopropanol, n-butanol or isobutanol, ethanediol, 1:2-propanediol, 1:3-propanediol or 2:3-butanediol. It is also possible to use as starting materials 20-enolethers, for example those of the aforementioned alkanols, or 20-enolesters, for example those of lower aliphatic carboxylic acids, such as formic, acetic, propionic or butyric acid.

As Lewis acids there are used electron pair acceptors, above all compounds of elements of the second or third group of the Periodic Table, for example those of magnesium, boron or aluminum. There may be mentioned Grignard compounds, for example lower alkyl magnesium halides such as methyl, ethyl, propyl or isopropyl magnesium chloride, bromide or iodide; boron or aluminum halides such as boron trifluoride or aluminum tribromide, or alcoholates, for example lower aluminum alkanolates such as aluminum ethylate, propylate, isopropylate or butylate. It is especially advantageous to use lower aluminum trialkyls or dialkyl aluminum hydrides such as aluminum trimethyl, triethyl, tripropyl, tri-isopropyl, tributyl or triisobutyl, or dimethyl, diethyl, dipropyl or diisobutyl aluminum hydride.

A preferred inert medium is a non-polar or weakly polar organic solvent, advantageously an aliphatic, cycloaliphatic, araliphatic or aromatic hydrocarbon, for example an alkane that is liquid at room temperature, for example n-octane, or a cycloalkane such as cyclohexane, methyl- or dimethyl-cyclohexane or benzene, or a monocyclic aralkane, such as toluene or xylene. Furthermore, there may be used ethers, for example diethyl ether, tetrahydrofuran or glycol ethers such as glycol dimethyl ether or polyglycol diethyl ethers, or mixtures of these solvents.

The reaction according to the present invention can be carried out at room temperature or with cooling or heating advantageously at a temperature ranging from 0 and 160° C., in the presence or absence of a reaction accelerator or of an inert gas.

When a 20-ketal of an 11β:18-oxido-18-hydroxy-20-oxo-pregnane is used as starting material, there is primarily obtained at a low temperature, for example, the intermediate represented in the following partial scheme of formulae, which is easy to convert into the desired Δ²⁰11β:18;18:20-bisoxido-pregnene in situ, for example by raising the reaction temperature or prolonging the reaction period:

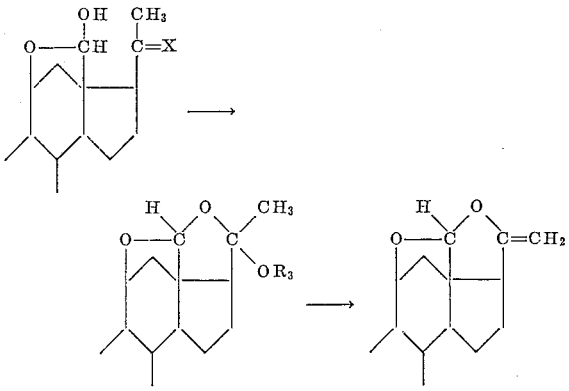

In the above formulae X stands for the group

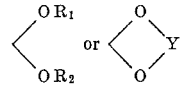

wherein $R_1$ and $R_2$ each represents, for example, a lower alkyl group and Y represents a lower alkylene group, and $R_3$ is any of the groups $R_1$, $R_2$ or —Y—OH.

If desired, the resulting Δ²⁰-11β:18;18:20-bisoxido-pregnenes may be hydroxylated in the known manner, for example with the aid of osmium tetroxide, ruthenium tetroxide or manganese dioxide, whereby from the primarily formed 11β:18;18:20-bisoxido-20:21-dihydroxy-pregnanes the tautomeric 11β:18-oxido-18:21-dihydroxy-20-oxopregnanes arise. The latter compounds can be esterified in known manner in position 21, for example by means of organic carboxylic acids, preferably such as contain at most 12 carbon atoms, such as formic, acetic, trifluoroacetic, trimethylacetic, propionic, succinic, caproic, hexahydrobenzoic, cyclopentylpropionic, benzoic or furoic acid, or their reactive functional derivatives, for example the halides or anhydrides thereof. It is also possible to epoxidize the Δ²⁰-11β:18;18:20-bisoxido compounds, for example with hydrogen peroxide in the presence of osmium tetroxide, tungsten trioxide or vanadium pentoxide, or by means of organic peracids such as peracetic, perbenzoic, meta-chloro-perbenzoic or monoperphthalic acid; the resulting 20:21-epoxide may be subjected to hydrolysis or acylolysis and then yields the said 11β:18-oxido-18:21-dihydroxy-20-oxopregnanes or their 21-esters. The hydrolysis is advantageously carried out with an aqueous inorganic or organic acid, and the acylolysis, for example, with the aid of the afore-mentioned carboxylic acids.

The invention further includes any modification of the process in which an intermediate obtained at any stage of the process is used as starting material and any remaining step/steps is/are carried out or the process is discontinued at any stage thereof, or in which a starting material is formed under the reaction conditions or is used in the form of one of its salts. Thus, for example, the starting material used may be an 18:11-lactone of an 11$\beta$-hydroxy-20-oxopregnane-18-acid or, for example a 20-ketal thereof, which is then converted into the starting material under the reaction conditions, especially with a lower dialkyl aluminum hydride.

The starting materials are known or, if new, they can be prepared by known methods. Important starting materials and reaction products are those which are easy to convert by the present process into the afore-mentioned physiologically active 11:18-dioxygenated corticoids, especially into aldosterone, for example $\Delta^4$-3:20-dioxo-11$\beta$:18-oxido-18-hydroxy-pregnene or $\Delta^5$-3:18-dihydroxy-11$\beta$:18-oxido-20-oxopregnene, or a ketal or diketal of these compounds, for example the ethyleneketal thereof.

The following examples illustrate the invention without in any way restricting its scope thereto.

*Example 1*

In the course of 5 minutes at 0 to 3° C. 2.5 ml. of a molar solution of diisobutyl aluminum hydride in toluene are added under a current of dry nitrogen to 433 mg. of $\Delta^5$-3:3;20:20-bisethylenedioxy - 11$\beta$:18-oxido-18-hydroxy-pregnene in 40 ml. of anhydrous toluene. The cooling bath is then removed and the substantially clear reaction solution is stirred for 22 hours at room temperature. The reaction mixture is then cooled again to 0 to 3° C., diluted with 5 ml. of tetrahydrofuran, 1 ml. of water is added, and the whole is vigorously shaken for 15 minutes while cooling it with ice. 1 g. of pure kieselguhr is added, the batch heated to 20 to 25° C., dried with 2.5 g. of sodium sulfate, and the solid substances are removed, carefully rinsing with a total of 60 ml. of tetrahydrofuran+toluene (1:3). The filtrate is evaporated under vacuum, and the residue is dissolved in 16 ml. of benzene and 144 ml. of hexane and chromatographed on a column of 20 g. of alumina of activity IV, which column has been prepared with the use of hexane. A 90:10-mixture and an 85:15-mixture of hexane and benzene elute a total of 153 mg. of $\Delta^{5,20}$-3:3-ethylenedioxy-11$\beta$:18;18:20-bisoxidopregnadiene which melts at 212 to 216° C. after one recrystallization from ether with the use of tetrahydrofuran as solution promoter.

The compound obtained as described above can be converted into 21-O-acetylaldosterone, for example in the following manner:

A solution of 3.7 mg. of $\Delta^{5,20}$-3:3-ethylenedioxy-11$\beta$:18;18:20-bisoxidopregnadiene in 0.25 ml. of molar pyridine in benzene and 0.25 ml. of ether is mixed at 0 to 3° C. with 2.8 to 3.0 mg. of osmium tetroxide and the whole is stirred for 2 hours at 0 to 3° C., then diluted with 0.75 ml. of benzene+ether 1:1 and agitated with 1 ml. of aqueous sodium ascorbinate solution (prepared by mixing equal parts by volume of 0.5-molar 1-ascorbic acid solution and 0.6-molar sodium bicarbonate solution) for 30 minutes at room temperature. The bottom phase is then extracted with a 1:1-mixture of benzene and ether and the extracts are combined with the upper phase washed with a small amount of the sodium ascorbinate solution described above and with water, and the solution is dried with sodium sulfate and evaporated. The residue represents crude $\Delta^5$-3:3-ethylenedioxy-11$\beta$:18-oxido-18:21-dihydroxy-20-oxopregnene; it is dehydrated by adding 0.75 ml. of benzene and evaporating it off again, then dissolved in 0.1 ml. of pyridine, and the solution is mixed with 0.12 ml. of acetic anhydride and left to itself for 16 hours at room temperature. The reaction mixture is then evaporated with the use of a rotatory oil pump, and the resulting acetylation product is dissolved in 1 ml. of 67% acetic acid and heated for 1 hour at 62 to 65° C. under nitrogen. The cooled solution is considerably evaporated under vacuum, and the residue is mixed with 0.2 N-ammonium bicarbonate solution and extracted with a 1:2-mixture of methylene chloride and ether. The extracts are washed neutral with water, combined, and the solution is dried with sodium sulfate and evaporated under vacuum. When the crude product is recrystallized from a small amount of acetone+ether, there are obtained 1:55 mg. of $\Delta^4$-3:20-dioxo-11$\beta$:18-oxido-18-hydroxy-21 - acetoxypregnene (21-O-acetylaldosterone) melting at 184–188.5° C.

*Example 2*

433 mg. of $\Delta^5$-3:3;20:20-bisethylenedioxy-11$\beta$:18-oxido-18-hydroxypregnene in 40 ml. of anhydrous toluene are reacted with 2.5 ml. of a molar solution of diisobutyl aluminum hydride as described in Example 1, and the crude product is chromatographed on 20 g. of alumina of activity IV. Hexane+benzene 90:10 and 85:15 elute at first, as in Example 1, the resulting $\Delta^{5,20}$-3:3-ethylenedioxy-11$\beta$:18;18:20-bisoxidopregnadiene. The following fractions eluted with hexane:benzene (50:50) are substantially free from residue. Further elution with benzene and with benzene+ethyl acetate (90:10), evaporation of the eluates and recrystallization of the residue from ether with the use of tetrahydrofuran as solution promoter yields a total of 160 mg. of $\Delta^5$-3:3-ethylenedioxy-11$\beta$:18;18:20-bisoxido - 20 - (2'-hydroxy-ethoxy)-pregnene melting at 172–175° C.

A solution of 5.4 mg. of the $\Delta^5$-3:3-ethylenedioxy-11$\beta$:18;18:20-bisoxido-20-(2'-hydroxy - ethoxy)-pregnene obtained in this manner in 0.5 ml. of anhydrous toluene is mixed with 5 mg. of aluminum isopropylate and the whole is heated for 6 hours at 100° C. under nitrogen. After cooling, the reaction solution is diluted with toluene+ether (1:1), washed at 0 to 3° C. with 2-molar potassium/sodium tartrate solution and with water, dried with sodium sulfate, filtered, and the filtrate is evaporated under vacuum. The crude product can be purified by recrystallization from tetrahydrofuran+ether and ether+isopropyl ether, to give a total yield of 3.9 mg. of pure $\Delta^{5,20}$-3:3-ethylenedioxy-11$\beta$:18;18:20 - bisoxidopregnadiene melting at 212–216° C., which is identical with the compound obtained as described in Example 1.

When the intermediately formed $\Delta^5$-3:3-ethylenedioxy-11$\beta$:18;20:20-bisoxido-20-(2'-hydroxyethoxy)-pregnene is further reacted with diisobutyl aluminum hydride as described in Example 1, it likewise furnishes the $\Delta^{5,20}$-3:3-ethylenedioxy - 11$\beta$:18;18:20-bisoxidopregnadiene suitable for further conversion into 21-0-acetylaldosterone.

*Example 3*

A solution of 21.7 mg. of $\Delta^5$-3:3;20:20-bisethylenedioxy-11$\beta$:18-oxido-18-hydroxypregnene in 2 ml. of anhydrous benzene, prepared in a current of dry nitrogen, is mixed with 0.5 ml. of a molar ethereal solution of methyl magnesium iodide, and the batch is stirred for 48 hours at room temperature, then diluted with benzene+ether (2:1), the solution is extracted with 2-molar potassium/sodium tartrate solution and with water while being cooled with ice, dried with sodium sulfate, filtered and evaporated under vacuum. To purify the crude product it is taken up in 1 ml. of tetrahydrofuran, applied to 10 sheets of Whatman paper No. 1 (size 18.5 x 45 cm.) which had previously been impregnated with the bottom phase, and chromatography is performed with the use of the solvent system A according to Bush at 38° C. From the chromatogram which has travelled down to the bottom the zone of Rf-value 0.80 to 0.90 is cut out, eluted with 20% and 40% aqueous tetrahydrofuran, and the combined eluates are concentrated under vacuum to a final volume of about 2.5 ml. The concentrate is then exhaustively extracted with benzene, the extract is washed with a small amount of water, dried with sodium sulfate, filtered, and the filtrate is evaporated at room temperature. Crystallization of the residue from ether yields 3.8 mg. of Δ$^{5:20}$-3:3-ethylenedioxy-11β:18;18:20-bisoxido-pregnadiene melting at 212 to 216° C.

When the zone of Rf-value 0.15 to 0.25 of the above chromatogram is eluted in identical manner and the eluate is recrystallized from ether, there are obtained 4.3 mg. of Δ$^5$-3:3-ethylenedioxy - 11β:18;18:20 - bisoxido-20-(2'-hydroxy-ethoxy)-pregnene melting at 172 to 175° C.

3.7 mg. Δ$^{5:20}$-3:3-ethylenedioxy-11β:18;18:20-bisoxido-pregnadiene are dissolved in 0.20 ml. of pyridine and there is added 0.10 ml. of an anhydrous, about 1 molar solution of hydrogen peroxide in ether and 0.15 ml. of ether. The mixture is cooled to 0 to 3° C. and 0.05 ml. of a 0.02-molar solution of osmium tetroxide in pyridine added. The batch is stirred for 6 hours at 0 to 3° C., then diluted with methylene chloride-ether (1:2) and extracted first with a 0.25-molar aqueous solution of sodium ascorbate, then with water. The aqueous portions are extracted twice with a (1:2) methylene chloride+ether mixture before being discarded, and these extracts are united with the main portion of the organic phase, which is then dried with sodium sulfate and evaporated in vacuo. Acetylation of the residue and deketalization of the acetylation product is carried out following the indications in the second part of Example 1. Upon preparative paper chromatographic purification of the crude product in the system formamide/cyclohexane-benezene (1:2) the pure Δ$^4$-3:20-dioxo - 11β-18 - oxido-18-hydroxy-21 - acetoxy-pregnene (21-O-acetyl-aldosterone) melting at 184 to 188.5° C. is obtained.

What is claimed is:

1. Process for the manufacture of Δ$^{20}$-11:18;18:20-bisoxido-pregnenes unsubstituted in 21-position wherein a Lewis acid is caused to react in an inert anhydrous medium, with a member selected from the group consisting of an 11β:18-oxido-18-hydroxy-20-oxo-5α- and 5β-pregnane, a 20-ketal, 20-enolether and 20-enolester thereof, a 19-nor-derivative thereof and a derivative of these compounds unsaturated in the ring system.

2. Process according to claim 1, wherein there is used as a Lewis acid a member selected from the group consisting of a compound of elements of the second and of the third group of the Periodic Table.

3. Process according to claim 2, wherein a Grignard compound is used as Lewis acid.

4. Process according to claim 2, wherein a boron halide is used as Lewis acid.

5. Process according to claim 2, wherein an aluminum halide is used as Lewis acid.

6. Process according to claim 2, wherein a lower aluminum alkanolate is used as Lewis acid.

7. Process according to claim 2, wherein a lower aluminum trialkyl is used as a Lewis acid.

8. Process according to claim 2, wherein a lower dialkyl-aluminum hydride is used as a Lewis acid.

9. Process according to claim 2, wherein the reaction is carried out in a member selected from the group consisting of a non-polar and a weakly polar organic solvent.

10. Process according to claim 2, wherein the reaction is carried out in a hydrocarbon.

11. Process according to claim 10, wherein toluene is used as a hydrocarbon.

12. Process according to claim 2, wherein the reaction is carried out in an ether.

13. Process as claimed in claim 1, wherein the reaction is carried out within the temperature range of 0 to 160° C.

14. Process according to claim 1, wherein a compound obtained is treated with a hydroxylating agent selected from the group consisting of osmium tetroxide, ruthenium tetroxide, manganese dioxide, whereby 11β:18-oxido-18:21-dihydroxy-20-oxo-pregnane compounds are obtained.

15. Process according to claim 14, wherein the compounds obtained are esterified in 21-position.

16. Process according to claim 1, wherein a compound obtained is treated with an epoxidizing medium selected from the group consisting of hydrogen peroxide in the presence of a member selected from the group consisting of osmium tetroxide, tungsten trioxide and vanadium pentoxide and an organic peracid and the epoxide thus obtained is hydrolysed with the aid of an aqueous acid.

17. A member selected from the group consisting of a compound of the formula

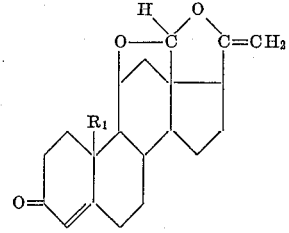

wherein $R_1$ is a member selected from the group consisting of hydrogen and methyl, its 3 lower alkylene ketals and corresponding Δ$^5$-3-hydroxy-pregnene compounds.

18. The Δ$^{4:20}$-3-oxo - 11β:18;18:20-bisoxido-pregnadiene.

19. The Δ$^{5:20}$-3:3-ethylenedioxy-11β:18;18:20-bisoxido-pregnadiene.

20. The Δ$^{5:20}$-3-hydroxy - 11β:18;18:20-bisoxido-pregnadiene.

No references cited.

LEWIS GOTTS, *Primary Examiner.*

H. FRENCH, *Assistant Examiner.*